Sept. 1, 1925.

E. H. OVERSMITH

VEHICLE SPRING

Filed Sept. 24, 1923

1,551,612

Inventor
Elmer H. Oversmith

Patented Sept. 1, 1925.

1,551,612

UNITED STATES PATENT OFFICE.

ELMER H. OVERSMITH, OF CLARENCE, NEW YORK.

VEHICLE SPRING.

Application filed September 24, 1923. Serial No. 664,545.

*To all whom it may concern:*

Be it known that I, ELMER H. OVERSMITH, a citizen of the United States of America, residing at Clarence, in the county of Erie and State of New York, have invented certain new and useful Improvements in Vehicle Springs, of which the following is a specification, reference being had therein to the accompanying drawings.

The invention relates to vehicle springs and more particularly to springs designed for use in motor vehicles. One of the objects of the invention is the provision of a spring comprising a plurality of spring sections which automatically function to take care of different loads so that the spring will provide resiliency under a wide range of loads. Another object is the provision of a spring in which the movements of the sections are limited to limit the vibration of the spring. A further object is the provision of means for limiting the rebound movement of the spring sections and at the same time for aligning the spring sections.

With these as well as other objects in view, the invention resides in the novel features of construction and combinations and arrangements of parts as more fully hereinafter set forth.

Figure 1:
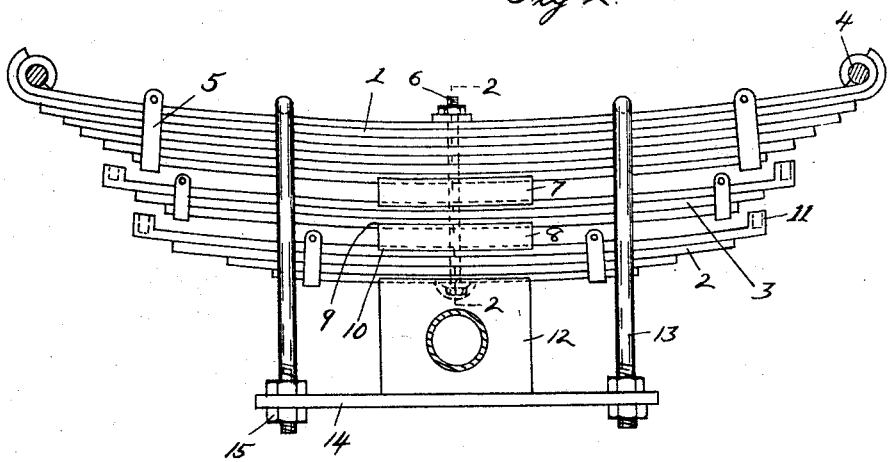
Figure 1 is a side elevation of a spring embodying my invention.
Figure 2:
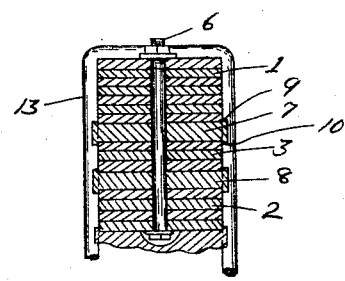
Figure 2 is a cross section on the line 2—2 of Figure 1.

The spring comprises in the present instance the upper spring section 1, the lower spring section 2 and the intermediate spring section 3, each section comprising a plurality of spring leaves. The upper spring section is provided at its ends with the eyelets 4 through which suitable shackle bolts extend for securing the spring to the motor vehicle frame. 5 are spring clips for securing the spring leaves of each section to each other, and 6 is a center bolt extending through the spring sections for securing the same to each other.

The upper and intermediate spring sections 1 and 3 are spaced from each other at their middle portions by means of the spacer or block 7 while the intermediate and lower spring sections 3 and 2 respectively are spaced from each other by means of the block 8. These spacers 7 and 8 are provided with apertures through which the center bolt 6 extends and are also preferably provided with upwardly and downwardly extending flanges 9 and 10 respectively which overlap the spring leaves of the spring sections immediately above and below the respective spacers, whereby the spring sections are held in alignment. The upper spring leaves of each of the intermediate and lower spring sections are provided at their ends with upwardly extending bosses 11 which have provision for lubricating the surfaces of the spring sections coming into contact therewith. As shown, each boss is provided with a recess having an open upper end, and containing a suitable fibrous material which may be impregnated with a lubricant.

For securing the spring to the axle housing 12 I have provided the pair of U bolts 13 embracing the spring sections 1, 2 and 3 and secured at the ends of their legs to the plate 14 by means of the nuts 15. This plate extends transversely of the axle housing and abuts its lower face and the U bolts are located intermediate the spacer 7 and the ends of the spring sections so that they will limit the rebound of the spring sections. Furthermore, these U bolts assist in maintaining the spring sections in alignment.

In operation, the upper spring section 1 will take care of light loads, but when the motor vehicle is carrying a heavier load the leaves of the upper section 1 will flex to bring the upper spring section into contact with the bosses 11 of the intermediate spring section 3 at which time the intermediate spring section will assist in carrying the load. If the motor vehicle is subjected to a still heavier load, the leaves of the intermediate spring section 3 will flex to bring the intermediate spring section into contact with the bosses 11 of the lower spring section 2 at which time all three spring sections cooperate to carry the load. In this connection it is evident that the number of spring sections may be varied as well as the number of spring leaves for each section, depending upon the duties for which the motor vehicle is designed. With this arrangement it is apparent that if the upper spring section is carrying a load without the assistance of the other spring sections and the motor vehicle is subjected to an impact by reason of the ground wheel dropping into a hole or the like, the leaves of the upper spring section will flex to bring the same into contact with the intermediate spring section which will temporarily normally assist in carrying the load and limit the flexing of the upper spring section. The lower spring section will also operate in the same manner when both the upper and intermediate spring sections are flexed downwardly. After flexing downwardly, the spring sections will tend to return to their original positions and their return movement is limited by the U bolts 13 which are located intermediate the ends of the spring sections and the spacers arranged between the spring sections. Thus it is seen that the vibration of the spring is limited and as a consequence, wear of the parts is decreased.

From the above description it will be readily seen that I have provided a simple construction of spring which provides for resiliency under various loads, and in which the vibration is maintained substantially at the minimum. It will also be seen that the means of attachment of the spring to the axle functions to limit the upward or rebound movement of the spring as well as assists in maintaining the spring sections in alignment.

What I claim as my invention is:

1. In a vehicle spring, the combination of a spring section comprising a plurality of spring leaves, a second spring section below said first-mentioned spring section and adapted to cooperate therewith to assist in carrying a greater load, said second spring section comprising a plurality of spring leaves, and a spacer between said spring sections for normally retaining the same in spaced relation to each other, said spacer having provision for maintaining said spring sections in alignment.

2. In a vehicle spring, the combination of a spring section including spring leaves having eyelets at its opposite ends, a second spring section extending longitudinally below said first-mentioned spring section and normally spaced therefrom, and contact means upon said second spring section and engageable with said first-mentioned spring section upon flexing thereof, said contact means having provision for lubricating the contact surfaces between said first-mentioned spring section and contact means.

3. In a vehicle spring, the combination with an axle housing, of a spring section, a second spring section extending below said first-mentioned spring section and normally spaced therefrom, and means secured to said axle housing and embracing said spring sections at points beyond said axle housing for limiting the rebound of said spring sections and maintaining the same in alignment with each other.

4. In a vehicle spring, the combination with an axle, of a leaf spring section, a second leaf spring section below said first-mentioned leaf spring section, a spacer between said sections for normally holding the same in spaced relation to each other, and U bolts secured to said axle and located between the ends of said spring sections and said spacer, said U bolts limiting the rebound of said spring sections and maintaining the same in alignment with each other.

In testimony whereof I affix my signature.

ELMER H. OVERSMITH.